United States Patent
Vejlgaard et al.

(10) Patent No.: US 12,075,364 B2
(45) Date of Patent: Aug. 27, 2024

(54) APPARATUSES AND METHODS FOR DISCOVERY PROCESS FOR CROSS LINK INTERFERENCE MEASUREMENTS

(71) Applicant: Nokia Technologies Oy, Espoo (FI)

(72) Inventors: Benny Vejlgaard, Gistrup (DK); Klaus Ingemann Pedersen, Aalborg (DK); Nuno Manuel Kiilerich Pratas, Gistrup (DK); Mark Doll, Stuttgart (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 415 days.

(21) Appl. No.: 17/311,395

(22) PCT Filed: Dec. 17, 2018

(86) PCT No.: PCT/EP2018/085291
§ 371 (c)(1),
(2) Date: Jun. 7, 2021

(87) PCT Pub. No.: WO2020/125931
PCT Pub. Date: Jun. 25, 2020

(65) Prior Publication Data
US 2022/0030522 A1    Jan. 27, 2022

(51) Int. Cl.
*H04W 52/24* (2009.01)
(52) U.S. Cl.
CPC .................. *H04W 52/245* (2013.01)
(58) Field of Classification Search
None
See application file for complete search history.

(56) References Cited

U.S. PATENT DOCUMENTS

| | | | |
|---|---|---|---|
| 11,233,623 B2* | 1/2022 | Xu | H04B 17/336 |
| 2012/0252510 A1* | 10/2012 | Wang | H04W 72/542 |
| | | | 455/501 |
| 2017/0303144 A1* | 10/2017 | Guo | H04B 17/318 |
| 2019/0274155 A1* | 9/2019 | Bhattad | H04L 5/0073 |
| 2020/0112420 A1* | 4/2020 | Xu | H04L 5/0073 |
| 2020/0169341 A1* | 5/2020 | Hwang | H04B 17/345 |
| 2020/0169435 A1* | 5/2020 | Kang | H04L 25/0226 |

(Continued)

FOREIGN PATENT DOCUMENTS

| | | |
|---|---|---|
| WO | WO 2017/026977 A1 | 2/2017 |
| WO | WO 2017/183866 A1 | 10/2017 |

(Continued)

OTHER PUBLICATIONS

3GPP TSG RAN Meeting #80, La Jolla, USA, Jun. 11-15, 2018, RP-181431, "New WID on Cross Link Interference (CLI), handling and Remote Interference Management (RIM) for NR", LG Electronics, 5 pgs.

(Continued)

*Primary Examiner* — Kodzovi Acolatse
(74) *Attorney, Agent, or Firm* — Lippes Mathias LLP

(57) ABSTRACT

A method, including obtaining, in a sidelink communication, an information about a resource on which a terminal transmits a reference signal; measuring a received power on the resource; providing an information on the received power; and using the information to mitigate cross link interference.

11 Claims, 11 Drawing Sheets

(56) References Cited

U.S. PATENT DOCUMENTS

| | | | |
|---|---|---|---|
| 2020/0213052 A1* | 7/2020 | Li | H04W 72/23 |
| 2020/0389805 A1* | 12/2020 | Kim | H04W 72/23 |
| 2021/0152261 A1* | 5/2021 | Kang | H04B 17/336 |
| 2021/0321417 A1* | 10/2021 | Kim | H04L 5/0048 |
| 2022/0248383 A1* | 8/2022 | Park | H04W 72/23 |

FOREIGN PATENT DOCUMENTS

| | | | | |
|---|---|---|---|---|
| WO | WO-2018084118 A1 * | 5/2018 | | H04L 5/0048 |
| WO | WO-2018084126 A1 * | 5/2018 | | H04L 5/0082 |
| WO | WO 2018/113947 A1 | 6/2018 | | |
| WO | WO-2018126792 A1 | 7/2018 | | |
| WO | WO-2018127001 A1 * | 7/2018 | | H04W 72/04 |
| WO | WO-2018128297 A1 | 7/2018 | | |
| WO | WO-2018219074 A1 * | 12/2018 | | H04L 5/001 |
| WO | WO-2019032779 A1 * | 2/2019 | | H04L 5/0048 |

OTHER PUBLICATIONS

Chang et al., "Interference analysis and performance evaluation for LTE TDD system", 2nd International Conference on Advanced Computer Control, Mar. 27-29, 2010, pp. 410-414.

Yun et al., "LTE-TDD interference analysis in spatial, time and frequency domain", Ninth International Conference on Ubiquitous and Future Networks (ICUFN), Jul. 4-7, 2017, pp. 785-787.

Pedersen et al., "A flexible 5G wide area solution for TDD with asymmetric link operation", IEEE Wireless Communications, vol. 24, No. 2, Apr. 2017, pp. 122-128.

Lee et al., "Aligned reverse frame structure for interference mitigation in dynamic TDD systems", IEEE Transactions on Wireless Communications, vol. 16, No. 10, Oct. 2017, pp. 6967-6978.

Long et al., "Interference-Cancelled Asymmetric Traffic Cellular Networks: Dynamic TDD Meets Massive MIMO", IEEE Transactions on Vehicular Technology, vol. 67, No. 10, Oct. 2018, pp. 9785-9800.

Łukowa et al., "Performance of strong interference cancellation in flexible UL/DL Tdd systems using coordinated muting, scheduling and rate allocation", IEEE Wireless Communications and Networking Conference, Apr. 3-6, 2016, 7 pages.

Huo et al., "Joint user scheduling and transceiver design for cross-link interference suppression in MU-MIMO dynamic TDD systems", 3rd IEEE International Conference on Computer and Communications (ICCC), Dec. 13-16, 2017, pp. 962-967.

Cavalcante et al., "Distributed Beamforming in Dynamic Tdd Mimo Networks With BS to BS Interference Constraints", IEEE Wireless Communications Letters, vol. 7, No. 5, Oct. 2018, pp. 788-791.

Catania et al., "Flexible UL/DL in small cell TDD systems: a Performance study with TCP traffic", IEEE 81st Vehicular Technology Conference (VTC Spring), May 11-14, 2015, 6 pages.

"3rd Generation Partnership Project; Technical Specification Group Radio Access Network; Evolved Universal Terrestrial Radio Access (E-UTRA); Physical layer; Measurements (Release 15)", 3GPP TS 36.214, V15.3.0, Sep. 2018, pp. 1-25.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331, V15.3.0, Sep. 2018, pp. 1-918.

"3rd Generation Partnership Project; Technical Specification Group Radio Access Network; NR; Medium Access Control (MAC) protocol specification (Release 15)", 3GPP TS 38.321, V15.3.0, Sep. 2018, pp. 1-76.

"3rd Generation Partnership Project; Technical Specification Group Radio Access Network; NR; Physical layer procedures for control (Release 15)", 3GPP TS 38.213, V15.3.0, Sep. 2018, pp. 1-101.

"3rd Generation Partnership Project; Technical Specification Group Radio Access Network; NR; Physical layer procedures for data (Release 15)", 3GPP TS 38.214, V15.3.0, Sep. 2018, pp. 1-96.

International Search Report and Written Opinion received for corresponding Patent Cooperation Treaty Application No. PCT/EP2018/085291, dated Aug. 21, 2019, 13 pages.

Office action received for corresponding European Patent Application No. 18826584.7, dated Mar. 28, 2023, 4 pages.

* cited by examiner

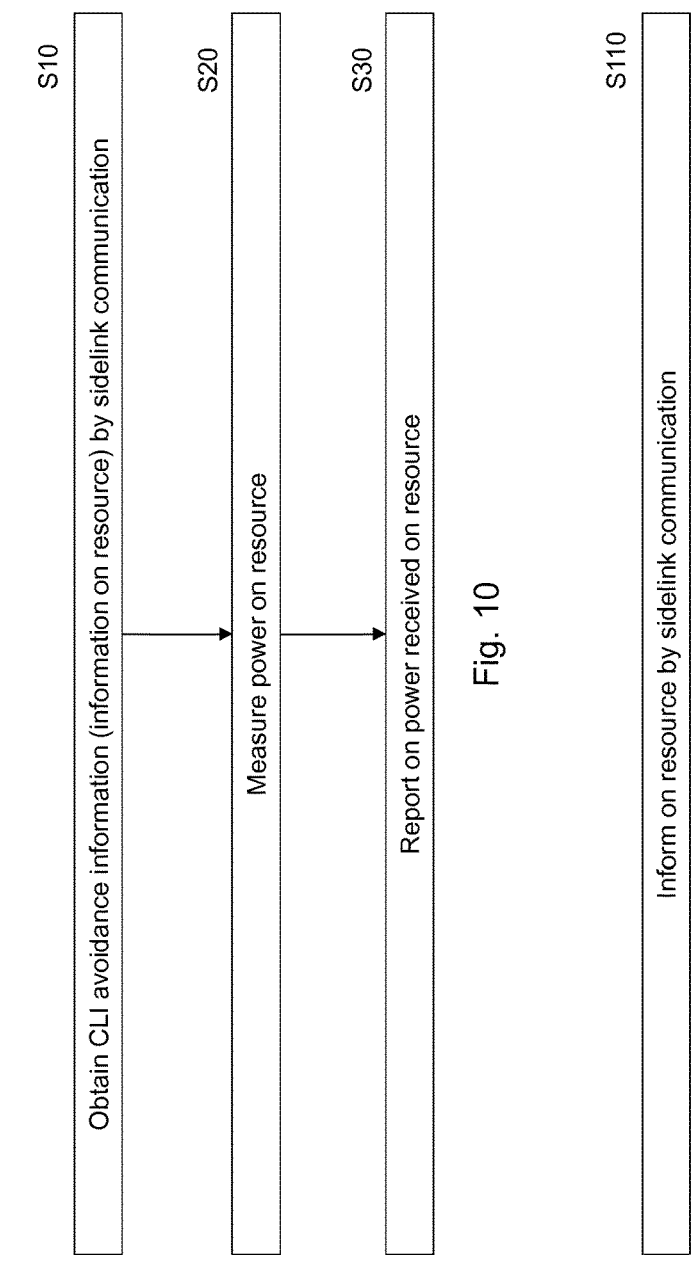

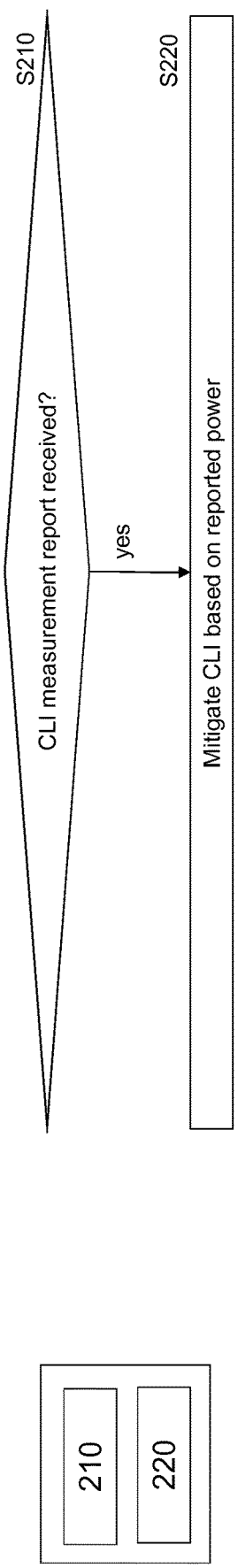

APPARATUSES AND METHODS FOR DISCOVERY PROCESS FOR CROSS LINK INTERFERENCE MEASUREMENTS

CROSS REFERENCE TO RELATED APPLICATION

This patent application is a U.S. National Stage application of International Patent Application Number PCT/EP2018/085291 filed Dec. 17, 2018, which is hereby incorporated by reference in its entirety.

FIELD OF THE INVENTION

The present invention relates to cross link interference measurements.

ABBREVIATIONS

3GPP 3$^{rd}$ Generation Partnership Project
3G/4G/5G 3rd/4th/5th Generation
BS Base Station
CBR Contention Based Ratio
CLI Cross Link Interference
CP Cyclic Prefix
CSI-RS Channel State Information-Reference Signal
D2D Device-to-device (communication)
DL Downlink
DMRS Demodulation Reference Signal
eNB evolved NodeB (base Station in 4G)
FDD Frequency Division Duplex
gNB Base Station in 5G/NR
IE Information Element
LTE Long Term Evolution
MAC Medium Access Control
NR New Radio (air interface standard of 5G systems)
OFDM Orthogonal Frequency Division Multiplex
PRB Physical Resource Block
ProSe Proximity Service
RAN Radio Access Network
Rel Release
RF Radio Frequency
RIM Remote Interference Management
RP Resource Pool
RRC Radio Resource Control
RSRP Reference Signal Received Power
RSSI Received Signal Strength Indicator
Rx Receive
SCS Sub-carrier Spacing
SRS Sounding Reference Signal
TDD Time Division Duplex
TS Technical Specification
Tx Transmit
UE User Equipment
UL Uplink
V2X Vehicle to anything
WI Work Item
WID Work Item Description
ZP Zero Power

BACKGROUND OF THE INVENTION

The 5G New Radio (NR) is largely designed to operate in Time Division Duplexing (TDD) mode with enhanced flexibility for link direction switching on per cell basis. That is, 5G NR is able to dynamically switch between uplink and downlink transmission directions. This kind of flexibility offers enhanced capabilities to adapt according to the offered uplink and downlink traffic, but also comes with the potential cost of undesirable cross link interference (CLI). The CLI comes in the form of gNB-2-gNB interference (i.e. one gNB transmits while the other one receives on the same resources) and UE-2-UE (i.e. one UE transmits while the other one receives on the same resources). Cross Link Interference (CLI) measurements are proposed in RP-181431. UE-2-UE CLI will be measured by UEs and reported back to the serving gNB for CLI mitigation measures. This means that once a UE is in RRC connected state, the serving gNB may ask neighboring gNBs for CLI avoidance information and command its UEs to perform UE-2-UE CLI measurements based on the provided information. CLI avoidance information includes information about DMRS and/or SRS to be sent in an upcoming subframe by the UEs of the neighboring gNB.

The UE-2-UE CLI measurements scheduling may cause significant signalling traffic overhead for all UEs in the neighbouring cells because the location of each UE within a cell is typically unknown and some UEs are exposed to CLI and others are not. However, the signalling (gNb to gNB via Xn signalling and gNB to UE RRC/MAC signalling) and CLI measurements will be addressed to all UEs causing both signalling overhead and additional UE energy consumption for all UEs regardless if they are exposed to CLI or not.

In line with the 3GPP NR assumptions, throughout this application, time synchronicity between gNBs is assumed such that radio frame and subframe boundaries are fully aligned. The gNBs may have different link directions, adjusted either on a subframe, slot, or intra-slot resolution. The adjustment of the link direction may be conducted dynamically within a radio frame at a slot level. For NR, a slot is defined by 14 symbols (assuming normal cyclic prefix—CP) or 12 symbols (extended CP). The slot length therefore depends on the sub-carrier spacing (SCS); i.e. equals 1 ms for 15 kHz SCS, 0.5 ms for 30 kHz SCS, 0.25 ms for 60 kHz SCS, etc. There are currently 56 defined slot formats for NR Rel-15, including downlink-only slot, uplink-only slot, and slot formats with mixtures of downlink and uplink symbols. Table 1 summarizes the types of experienced UE interference depending on whether the two considered UEs transmit (Tx) or receive (Rx).

TABLE 1

Types of experienced UE-2-UE interference

| UE1 | UE2 | Comments |
| --- | --- | --- |
| Rx | Tx | CLI scenario |
| Tx | Tx | Normal co-channel interference |
| Tx | Rx | CLI scenario |
| Rx | Rx | No impact |

The problem of CLI is recognized also by 3GPP, and planned to be addressed in new Work Item, starting from January 2019, as summarized below (copy paste from the WID):

WID on Cross Link Interference (CLI) handling and Remote Interference Management (RIM) for NR (RP-181431).

Justification:

"NR supports paired and unpaired spectrum and strives to maximize commonality between the technical solutions, allowing FDD operation on a paired spectrum, different transmission directions in either part of a paired spectrum, TDD operation on an unpaired spectrum where the transmission direction of time resources is not dynamically changed, and TDD operation on an unpaired spectrum where the transmission direction of most time resources can be dynamically changing. DL and UL transmission directions at least for data can be dynamically assigned on a per-slot basis at least in a TDM manner. It is noted that transmission directions include all of downlink, uplink, sidelink, and backhaul link. NR supports at least semi-statically assigned DUUL transmission direction as gNB operation, i.e., the assigned DUUL transmission direction can be signalled to UE by higher layer signalling." The work item should specify cross-link interference mitigation techniques to support flexible resource adaptation. Furthermore, it also specifies remote-interference management techniques.

Objective:

The detailed objectives for cross-link interference mitigation to support flexible resource adaptation for unpaired NR cells are:

Specify cross-link interference measurements at a UE (e.g., CLI-RSSI and/or CLI-RSRP) [RAN1, RAN4]
  Identify when cross-link interference mitigation techniques based on such measurement(s) provide benefits with practical RF performance [RAN4]
Specify network coordination mechanism(s) including at least exchange of intended DUUL configuration [RAN1, RAN3]
Perform coexistence study to identify conditions of coexistence among different operators in adjacent channels [RAN4]
  Target no or very minimal impact on RF requirement In TDD networks interference from one UE to another will significantly degrade performance when one UE is transmitting close to another UE that is in receiving mode on the same resource. This case will occur in TDD networks when gNB are not synchronized and/or when resources are assigned dynamically between UL/DL.

CLI will be measured by UEs and reported back to the gNB for CLI mitigation measures. This means that once a UE is in RRC connected state, the serving gNB may ask neighboring gNB for CLI avoidance information and provide it to its served UEs for measuring CLI.

FIG. 1 shows UE1 interfering to UE2 while both UEs are connected to two different gNBs (gNB1 and gNB2). I.e., in the scenario of FIG. 2, UE1 transmits on the same resource (time, frequency) on which UE2 receives. A priori, none of gNB1 and gNB2 is aware of the interference UE1 causes to UE2.

There are many papers in the open literature that address various traffic and interference aspects of LTE and NR TDD systems. A non-exhaustive list of such publications is included below:

P. Chang, Y. Chang, Y. Han, C. Zhang and D. Yang, "Interference analysis and performance evaluation for LTE TDD systems," in Proc. IEEE ICACC, Shenyang, 2010, pp. 410-414.

D. Yun and W. Lee, "LTE-TDD interference analysis in spatial, time and frequency domain," in Proc. IEEE ICUFN, Milan, 2017, pp. 785-787.

K. I. Pedersen, G. Berardinelli, F. Frederiksen and P. Mogensen, "A flexible 5G wide area solution for TDD with asymmetric link operation," IEEE Wireless Commun., vol. 24, no. 2, pp. 122-128, April 2017.

K. Lee, Y. Park, M. Na, H. Wang and D. Hong, "Aligned reverse frame structure for interference mitigation in dynamic TDD systems," IEEE Trans. Wireless Commun., vol. 16, no. 10, pp. 6967-6978, October 2017.

Y. Long and Z. Chen, "Interference-canceled asymmetric traffic cellular networks: dynamic TDD meets massive MIMO," IEEE Trans. Veh. Technol., early access.

A. Łukowa and V. Venkatasubramanian, "Performance of strong interference cancellation in flexible UL/DL TDD systems using coordinated muting, scheduling and rate allocation," in Proc. IEEE WCNC, Doha, 2016, pp. 1-7.

Z. Huo, N. Ma and B. Liu, "Joint user scheduling and transceiver design for cross-link interference suppression in MU-MIMO dynamic TDD systems," in Proc. IEEE ICCC, Chengdu, 2017, pp. 962-967.

E. d. O. Cavalcante, G. Fodor, Y. C. B. Silva and W. C. Freitas, "Distributed beamforming in dynamic TDD MIMO networks with cell to cell interference constraints," IEEE Wireless Commun. Lett, early access.

D. Catania, M. Sarret, A. Cattoni, F. Frederiksen, G. Berardinelli and P. Mogensen, "Flexible UL/DL in small cell TDD systems: a Performance study with TCP traffic," in Proc. IEEE VTC, Glasgow, 2015, pp. 1-6.

3GPP WI (WID) on Cross Link Interference (CLI) handling and Remote Interference Management (RIM) for NR [RP-181431]) for Rel. 16 will start January 2019 analyzing solutions where UEs can be scheduled/triggered to measure CLI. The network can then schedule a user accordingly, in order to minimize/avoid CLI. The focus is only for scheduling of CLI measurements in RRC connected state.

Direct information exchanges between devices have been standardized in the context of LTE. Sidelink is an LTE feature first introduced in 3GPP Release 12 aiming at enabling device-to-device (D2D) communications within legacy cellular-based LTE radio access networks. Sidelink has been enriched in Releases 13 and 14 with various features. D2D is applicable to public safety and commercial communication use-cases, and recently (Re1.14) to vehicle-to-everything (V2X) scenarios. Sidelink enables the direct communication between proximal UEs using the newly defined PC5 interface. Thus, data does not need to go through the eNB. Services provided in this way are often called "Proximity Services" (or ProSe) and the UEs supporting this feature "ProSe"-enabled UEs.

In this setting, for a D2D link to be established, the devices have first to discover each other. This can be accomplished with aid from the network or by the direct exchange of a discovery beacon over radio resources scheduled for discovery.

D2D functionality (discovery and communication establishment) have been specified in 3GPP in release 12 and 13 in the context of ProSe and Public Security Services; and in release 14 and 15 in the context of V2X for LTE. In ProSe the goal was to enable user plane transactions, while in V2X the goal was to enable the broadcasting of traffic security messages.

SUMMARY OF THE INVENTION

It is an object of the present invention to improve the prior art.

According to a first aspect of the invention, there is provided an apparatus, comprising means for obtaining configured to obtain, in a sidelink communication, an information about a resource on which a terminal transmits a reference signal; means for measuring configured to measure a received power on the resource; means for providing configured to provide an information on the received power.

According to a second aspect of the invention, there is provided an apparatus, comprising means for providing configured to provide an information about a resource in a sidelink communication, wherein a reference signal is transmitted on the resource.

According to a third aspect of the invention, there is provided an apparatus, comprising means for monitoring configured to monitor if a report on a power of a cross link interference a served terminal receives on a resource is received; means for mitigating configured to mitigate, if the report is received, a cross link interference for the served terminal based on the report on the power, wherein the served terminal is served by a serving base station.

According to a fourth aspect of the invention, mere is provided an apparatus, comprising means for obtaining configured to obtain a neighbor information about a resource; means for muting configured to mute a transmission of a serving base station on the resource; means for configuring configured to configure a served terminal to monitor a power the served terminal receives on the resource; means for mitigating configured to mitigate a cross link interference for the served terminal based on a received report on a power the served terminal receives on the resource, wherein the served terminal is served by the serving base station; according to the neighbor information, the resource is scheduled by the neighbor base station to be used for transmission by a neighbor terminal; the neighbor base station is different from the serving base station.

According to a fifth aspect of the invention, there is provided a method, comprising obtaining, in a sidelink communication, an information about a resource on which a terminal transmits a reference signal; measuring a received power on the resource; providing an information on the received power.

According to a sixth aspect of the invention, there is provided a method, comprising providing an information about a resource in a sidelink communication, wherein a reference signal is transmitted on the resource.

According to a seventh aspect of the invention, there is provided a method, comprising monitoring if a report on a power of a cross link interference a served terminal receives on a resource is received; mitigating, if the report is received, a cross link interference for the served terminal based on the report on the power, wherein the served terminal is served by a serving base station.

According to an eighth aspect of the invention, there is provided a method, comprising obtaining a neighbor information about a resource; muting a transmission of a serving base station on the resource; configuring a served terminal to monitor a power the served terminal receives on the resource; mitigating a cross link interference for the served terminal based on a received report on a power the served terminal receives on the resource, wherein the served terminal is served by the serving base station; according to the neighbor information, the resource is scheduled by the neighbor base station to be used for transmission by a neighbor terminal; the neighbor base station is different from the serving base station.

Each of the methods of the fifth to eighth aspects may be a method of cross link interference measurement.

According to a ninth aspect of the invention, there is provided a computer program product comprising a set of instructions which, when executed on an apparatus, is configured to cause the apparatus to carry out the method according to any of the fifth to eighth aspects. The computer program product may be embodied as a computer-readable medium or directly loadable into a computer.

According to some example embodiments of the invention, at least one of the following advantages may be achieved:

CLI measurement scheduling overhead is removed;
Less CLI reporting if a nearby UE is not present;
Less UE energy consumption;
Existing UE and gNB interfaces may not be affected.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred example embodiments of the present invention which is to be taken in conjunction with the appended drawings, wherein:

FIG. 9 shows an apparatus according to an example embodiment of the invention;
FIG. 10 shows a method according to an example embodiment of the invention;
FIG. 11 shows an apparatus according to an example embodiment of the invention;
FIG. 12 shows a method according to an example embodiment of the invention;
FIG. 13 shows an apparatus according to an example embodiment of the invention;
FIG. 14 shows a method according to an example embodiment of the invention.

DETAILED DESCRIPTION OF CERTAIN EXAMPLE EMBODIMENTS

Herein below, certain example embodiments of the present invention are described in detail with reference to the accompanying drawings, wherein the features of the example embodiments can be freely combined with each other unless otherwise described. However, it is to be expressly understood that the description of certain example embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

The goal of CLI measurements is to improve overall system performance. Thus, it is desirable to find CLI avoidance mechanisms that incur minimum signalling overhead and UE energy consumption.

More in detail, a main objective for UE CLI measurements is to measure/map interference from nearby UEs. The conventional mechanism described hereinabove, according to which a gNB requests all its served UEs to measure CLI, will map the entire interference from all UEs. This will cause both a significant signaling overhead and a lot of CLI measurements, including CLI measurements from far away UEs that do not cause any interference.

In summary, a problem of conventional CLI measurements is how to determine which UEs are in close proximity to each other, as the CLI measurements from these UEs only are relevant. The current assumption is that any CLI avoidance will be mediated and triggered via the network, which will cause a significant signaling overhead and UE energy consumption for the CLI measurements, due to:

- Inability to detect from which UEs the CLI should be measured;
- Scheduling of the CLI measurements (between any two or more devices across two or more cells);
- Exchange of these CLI measurements between the gNB and UE;
- Exchange of CLI measurement assistance information on scheduled UL reference signal transmissions between gNBs to enable correct configuration of UEs' CLI measurements;
- Conveying this CLI measurement assistance information from gNB to UE;
- Enactment of CLI avoidance triggered by the gNBs;
- Additional UE energy consumption due to unnecessary CLI measurements (due to the uncertainty of the relative positions, as outlined hereinabove).

The prior art studies do not address the problem of UE discovery procedures to enable CLI measurements. They are only related to RRC connected mode but not to the transition from RRC idle mode to RRC connected mode or in RRC inactive mode. There is no work presented yet on how to utilize the UE sidelink (D2D, ProSe) to optimize the CLI measurements process. The standardization activities related to sidelink (D2D, ProSe) did not consider the re-utilization of the D2D discovery and communication mechanisms to enable efficient signaling for situations where the information about the proximity between devices is essential.

Figure 1:
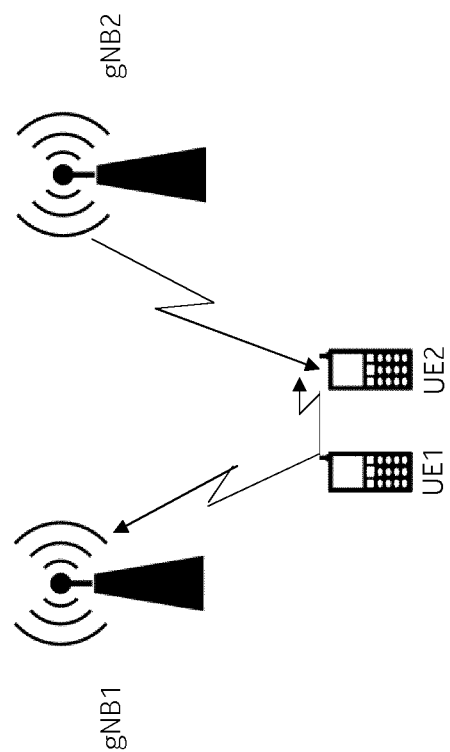
FIG. 1 shows a CLI scenario.
Figure 2:
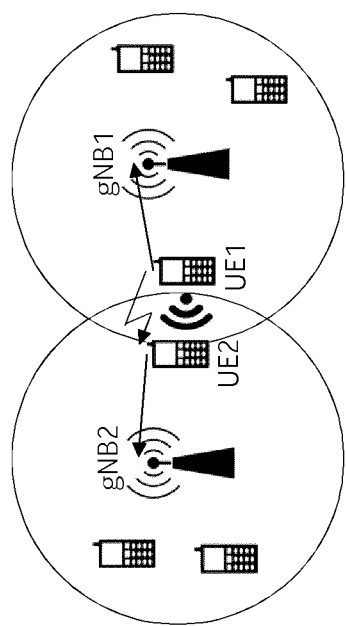
FIG. 2 depicts CLI detection, measurements, and reporting according to some example embodiments of the invention.

FIG. 2 depicts a scenario with UE-2-UE CLI according to some example embodiments of the invention, where the device causing the CLI (UE2) is near UE1. From a signalling efficiency perspective, it makes sense to localize the signalling exchanges, i.e. upon the detection of CLI conditions UE1 and UE2 should be able to exchange direct signalling that may aid on the avoidance of this CLI. According to some embodiments of the invention, the detection mechanism of sidelink (ProSe) is adapted to enable the detection of the presence of UEs originating the CLI in a vicinity of a monitoring device, as depicted in FIG. 2.

That is, according to some example embodiments of the invention, the UE measures the CLI from one or more nearby UEs on basis of the UE sidelink information.

Rather than the gNB informing the UEs in a cell to measure and report UE-2-UE CLI, as according to the prior art, the UE autonomously detects nearby UEs via D2D communications between the UEs.

The procedure according to some example embodiments of the invention may include the following process:

- UE1 is transmitting to gNB1 (i.e., UE1 is served by gNB1).
- UE1 will broadcast SRS and/or DMRS information to nearby UEs (optionally, the UEs may exchange further information via the PC5 interface of sidelink). The SRS and/or DMRS information comprises an indication of the resource (time, frequency) used by UE1 to transmit the SRS and/or DMRS.
- Nearby UE (e.g. UE2) detects UE1 and measures CLI using RSRP (knowing SRS/DMRS information)
- UE2 reports the CLI to gNB2 (potentially only in case the CLI is above a given threshold)

Some example embodiments of the invention remove the CLI scheduling overhead, leaving only the CLI reporting of the CLI (which may be limited to cases above a predefined threshold).

That is, according to some example embodiments of the invention:

- UE in RRC connected mode scans for proximity UEs in RRC connected mode
- The UEs exchange SRS/DMRS information for CLI measurement purposes (at least one of the UEs informs at least one of the other UEs)
- The UE informed about SRS/DMRS measures CLI from dedicated UE with known SRS/DMRS information
- UE reports to its serving gNB the CLI from active and nearby UEs.

In order to perform a sidelink communication to inform (get informed) on resources used to transmit SRS and/or DMRS, the UEs require time and frequency resources. In the sidelink nomenclature, they are grouped into a set of resources denoted as a "resource pool".

This resource pool is defined in time through a sub-frame bitmap (which indicates which sub-frames within a frame or group of frames can be used for sidelink exchanges) and in frequency by one or more ranges of contiguous PRBs. However, some example embodiments of the invention are not limited to me restrictions by sidelink according to the present specification. They may use arbitrarily defined resources.

Figure 3:
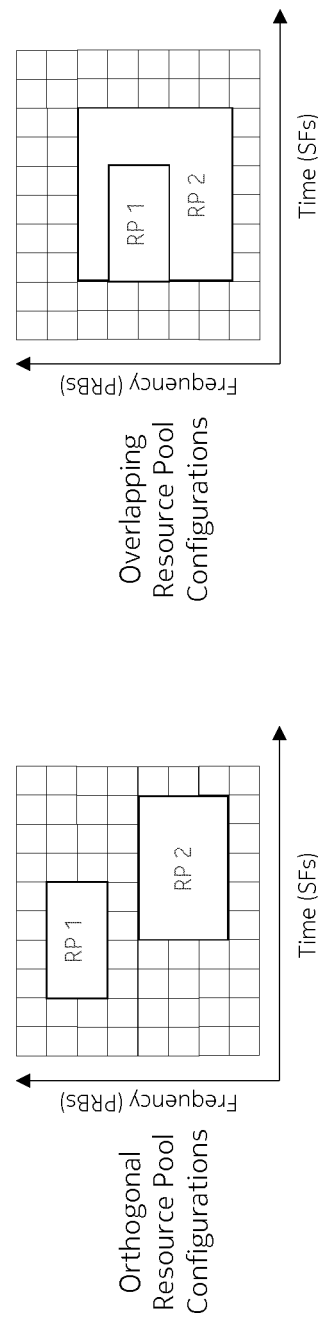
FIG. 3 depicts some resource pool configurations for CLI avoidance message exchange according to some example embodiments of the invention.

For a communication to take place, this resource pool needs to be known by all potential participating devices. There are three approaches for the dissemination of this information:

i. Dynamic provisioning: The participating gNBs negotiate common time and frequency resource(s) allocated to the resource pool. The basis of this negotiation can be for example based on the common time and frequency resources between gNBs, the radio load that each gNB is experiencing, etc.;

ii. Fixed provisioning: The resource(s) provisioned in the resource pool are common to all gNBs operating in the same carrier frequency. For example, this can be accomplished by a fixed definition in the 3GPP standard, or by some other pre-configuration measure;

iii. Hybrid provisioning: Specific groups of time and frequency resources are assigned to different resource pool configurations (including configurations with different amounts of resources to enable adaptation to varying radio load). The groups may be preconfigured, e.g. based on a 3GPP standard. The defined resource pool configurations may be orthogonal to each other (as depicted in FIG. 3, left side) or super sets of each other (i.e. overlapping each other as depicted in FIG. 3, right side). The gNBs negotiate which group of resources is to be used for the sidelink communication. In hybrid provisioning, the negotiation between gNBs has a smaller search space than according to (i).

In practice, (iii) is typically a preferred approach, as it combines pre-defined resource pools with the possibility of adaptation to the radio congestion conditions experienced at each gNB. In case of (i) and (iii), the UEs surveil if an information about a sidelink resource is received and set up the sidelink communication on the sidelink resource The amount of resources dedicated to the CLI avoidance exchanges (i.e. to exchange information about the resource used for transmission of SRS and/or DMRS) may be dimensioned according to the expected amount of devices (CLI avoidance exchange load) that will be actively exchanging the CLI related messages as well as the protocol in place.

The resource pool may be dedicated to the CLI avoidance exchanges or can be shared with the other sidelink services such as Prose or V2x.

Figure 4:
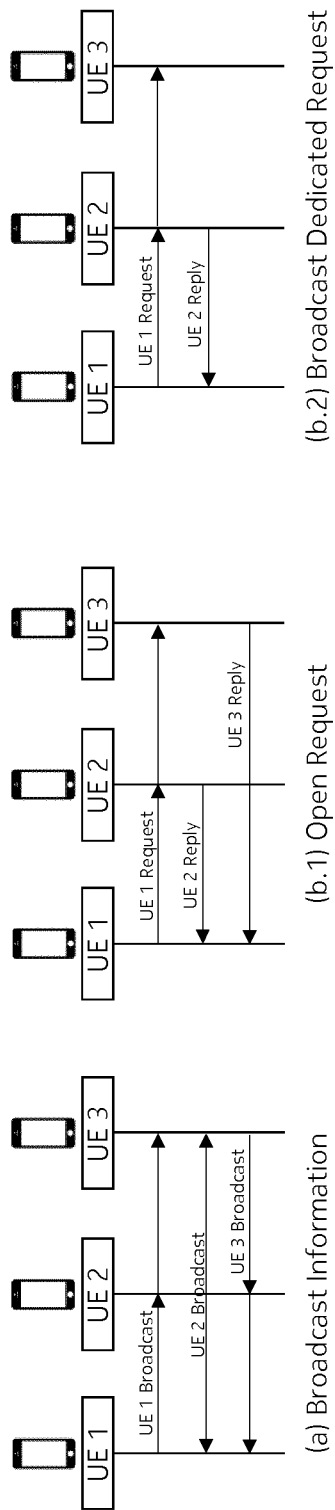
FIG. 4 depicts some CLI avoidance message exchange protocols according to some example embodiments of the invention.

The exchange of the CLI avoidance messages may be performed according to one of the following two main protocol types:

a) Broadcast Information (FIG. 4(*a*)): One UE broadcasts its CLI avoidance information (i.e., a resource on which the UE transmits a reference signal such as SRS and/or DMRS) and the other nearby UEs listen; In some example embodiments of the invention, the sidelink connection is scheduled. Scheduling increases the reliability of the exchange (avoid collisions). On the other hand, scheduling requires the coordination of the UEs involved and the gNBs involved. Furthermore, it requires the knowledge at the gNB which UEs to schedule (i.e. the UEs affected by CLI or causing CLI). Therefore, in some example embodiments of the invention, the sidelink communication of the UEs is not scheduled. The UEs use the resources available in the resource pools to broadcast/request CLI information in a contention-based manner.

b) Request: One UE broadcasts or transmits (point-2-point transmission) a request to receive the CLI avoidance information and the other nearby UEs reply to it. This protocol has two variants:

(b.1) Open request (FIG. 4(*b*.1)): The request is open (not dedicated to a particular UE) and therefore, every UE in proximity of the requesting device replies;

(b.2) Dedicated request (FIG. 4(*b*.2)): The request targets one UE or a specific group of UEs in the proximity of the device and therefore, only these replies back. There is some prior context establishment between the two UEs, e.g. due to a prior sidelink establishment or provided by the network. Such a context establishment is also needed if the request is transmitted in a point-2-point transmission.

In some example embodiments of the invention, the transmissions on the sidelink resources are scheduled (contention-free). As this leads to significant signaling overhead (i.e. all the transmitting and receiving devices, across multiple gNB, need to be scheduled), in some example embodiments of the invention, contention-based protocols are used. Typically, contention-based protocols introduce one or two limitations:

Collisions—when the number of actively transmitting UEs is close to or higher than the number of contention resources available in the resource pool. The occurrence of collisions can be controlled by two joint approaches:

Distributed access control: The UEs monitor the resource pool. During their monitoring of the resource pool, they measure the Contention Based Ratio (CBR, see 3GPP TS 36.214). They may decide to initiate their transmission based on the measured CBR and a predefined CBR limit for that resource pool (see 3GPP TS 36.331);

Adaptive Resource Pool: The participating gNBs select the appropriate resource pool size depending on the current density of devices deployed.

"Rendezvous mismatch"—due to the half-duplex nature of TDD operation in sidelink, the UEs are either transmitting or listening to the resources inside the resource pool. This can be addressed by allowing the devices to retransmit a sufficient number of times to ensure that all UEs in their vicinity are able to receive the transmission. The number must not be too large in order to ensure that the number of transmissions does not lead to network congestion.

In protocol (a) "Broadcast information" and (b) "Request", the UE initiating the transmission is the one controlling the occurrence of retransmissions. In the case of (b) the eventual responses to UE 1 from the other UEs in its vicinity are triggered by the UE 1 request.

For reduction of protocol complexity, protocol (a) is preferable. It is in place for the exchange of the traffic safety messages in LTE V2X.

The behavior of the proposed CLI avoidance mechanism may be "continuous" or "triggered" on demand by the gNB upon detection (via UE feedback) of the downlink interference conditions. In the continuous setting, the UE is always monitoring the CLI avoidance resource pool and will periodically broadcast its own CLI related information.

Figure 5:
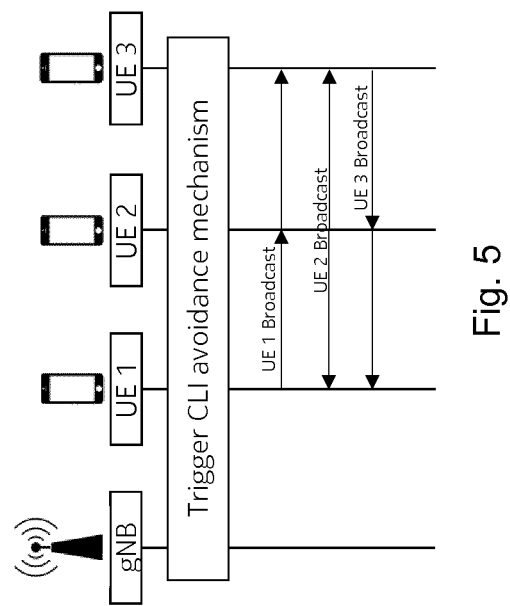
FIG. 5 depicts a variant of a CLI avoidance message exchange protocol according to some example embodiments of the invention.

In the gNB triggered setting, the gNB triggers the CLI avoidance exchanges (as depicted in FIG. 5 for the broadcast protocol). Only if the gNB triggers the CLI avoidance exchange, the UEs served by this gNB monitor the CLI avoidance resource pool and broadcast their own CLI related information. By triggering the CLI avoidance exchange (in particular: the broadcasting of the CLI avoidance information), overloading the resources for CLI avoidance with unnecessary broadcasts may be avoided, in particular, when no CLI is happening.

Figure 6:
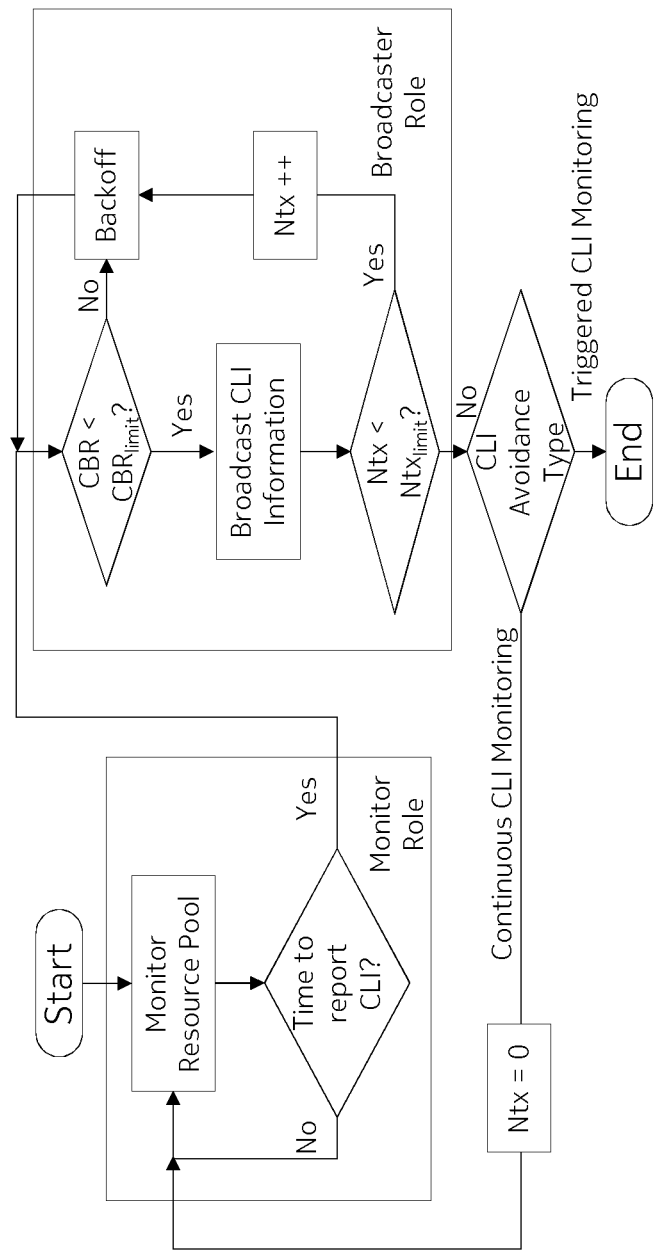
FIG. 6 shows a UE workflow of the broadcast CLI avoidance protocol according to some example embodiments of the invention.
Figure 7:
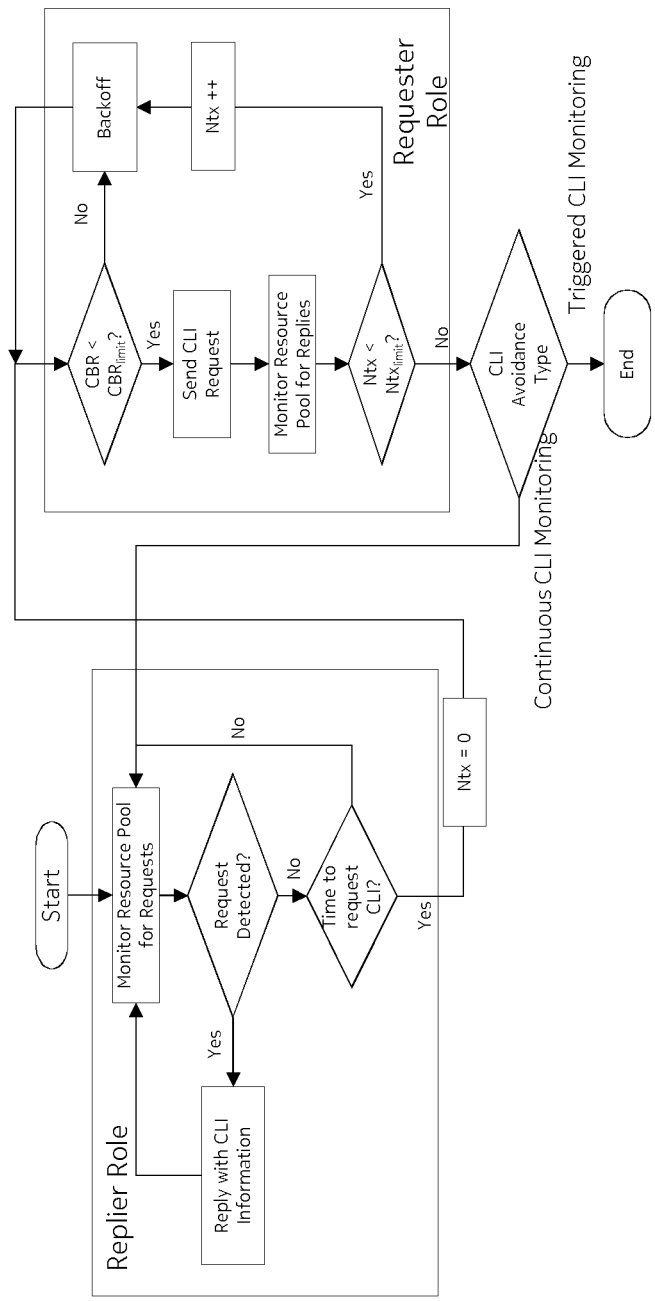
FIG. 7 shows a UE workflow of the Open Request CLI avoidance protocol according to some example embodiments of the invention.
Figure 8:
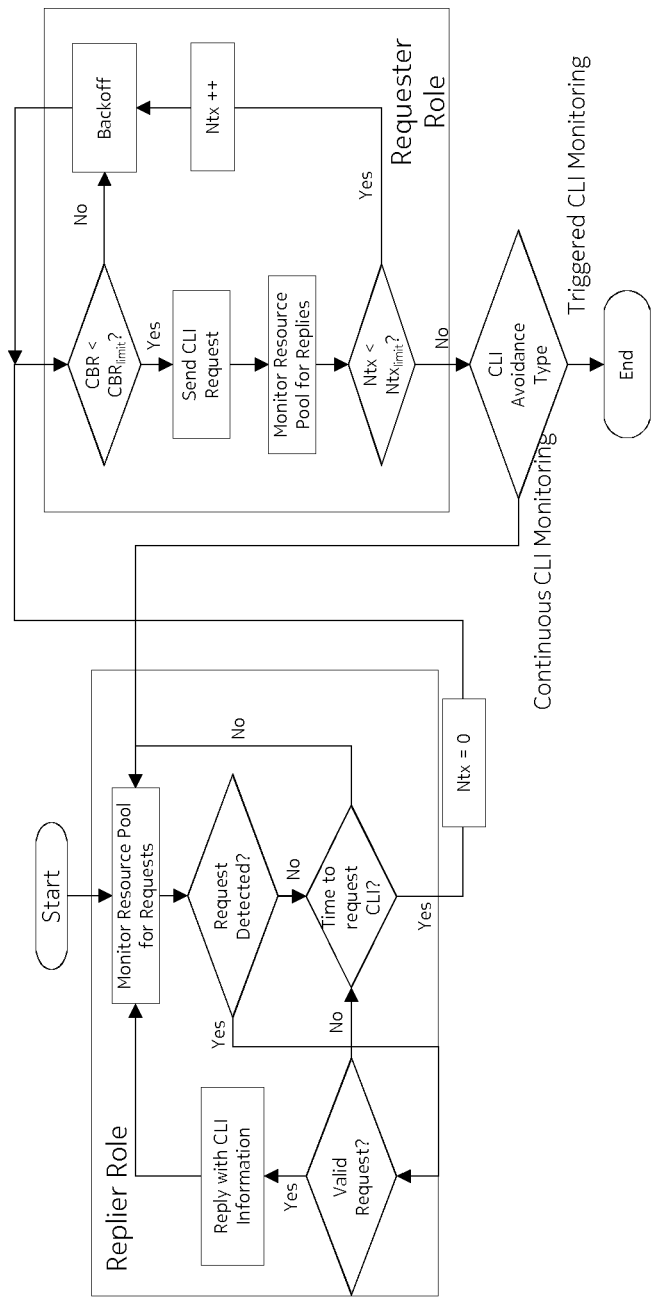
FIG. 8 shows a UE workflow of the Dedicated Request CLI avoidance protocol according to some example embodiments of the invention.

FIGS. 6 to 8 show UE workflows for the different protocols according to some example embodiments of the invention.

FIG. 6 shows the UE workflow comprising monitor role (left side) and broadcaster role (right side) for the broadcast protocol. In this protocol, the UE (monitor role) monitors the resource pool. In addition, it checks if it should report (broadcast) CLI avoidance information (i.e. information on the resource used for transmitting SRS and/or DMRS). If the time to broadcast (report) this information, the workflow changes to that of the broadcaster role.

In the broadcaster role, UE checks if the contention-based ratio CBR is less than the limit $CBR_{limit}$. If it is not, UE backs off from broadcasting, otherwise it broadcasts the CLI avoidance information. Then, the broadcaster role checks if the number of broadcast transmissions Ntx is smaller than a limit Ntx$_{limit}$. If yes, Ntx is incremented by one and the broadcasting is repeated after a while (here indicated as backoff, but the time interval between two broadcast transmissions may be the same or different from the backoff interval). If the maximum number Ntx$_{limit}$ of broadcast transmissions is reached, it is checked if the monitoring and broadcasting is triggered by gNB or continuous ("CLI avoidance type"). In the former case, the method is stopped. In the latter case, the counter Ntx is reset, and UE continues to monitor the resource pool (monitor role). Each of CBR$_{limit}$ and Ntx$_{limit}$ may be predefined or controlled by the serving gNB.

FIG. 7 shows the UE workflow comprising replier role (left side) and broadcaster role (right side) for the open request protocol. In the replier role, UE monitors if a request for CLI avoidance information is received. If a request is received, UE replies with the CLI avoidance information, and then continues monitoring for such requests. If a request is not detected, it checks if it is time to request CLI avoidance information (i.e. information on the resource used for transmitting SRS and/or DMRS) from other UE(s). If it is not, UE continues monitoring for requests. If it is time, UE resets the counter Ntx and changes its role to the broadcaster role.

In the broadcaster role, UE checks if the contention-based ratio CBR is less than the limit CBR$_{limit}$. If it is not, UE backs off from the transmission of a request for CLI avoidance information, otherwise it requests CLI avoidance information. Then, it monitors the resource pool for replies to its request. Furthermore, the broadcaster role checks if the number of request transmissions Ntx is smaller than a limit Ntx$_{limit}$. If yes, Ntx is incremented by one and the transmitting of the request is repeated after a while (here indicated as backoff but the time interval between two request transmissions may be the same or different from the backoff interval). If the maximum number Ntx$_{limit}$ of request transmissions is reached, it is checked if the monitoring and requesting is triggered by gNB or continuous ("CLI avoidance type"). In the former case, the method is stopped. In the latter case, the UE continues to monitor the resource pool for requests (monitor role). Each of CBR$_{limit}$ and Ntx$_{limit}$ may be predefined or controlled by the serving gNB.

FIG. 8 shows the UE workflow comprising replier role (left side) and broadcaster role (right side) for the dedicated request protocol. FIG. 8 corresponds to FIG. 7, except that UE in the replier role additionally checks if the detected request is dedicated for the UE ("valid request?"). The replier role replies with the CLI avoidance information only if the request is valid. Otherwise, it does not reply with the CLI avoidance information but checks if it is time to request CLI avoidance information from other UE(s).

UE may report the CLI measurement to the serving gNB in one of several potential formats, i.e. according to an extension of the RRC MeasResults IE. For example, UE may use a report type: CLI RSSI (when origin of CLI is unknown), or UE may use a report type comprising a (list of)<CLI RSRP, interfering UE ID>pairs. In some example embodiments, UE may report CLI RSRP only if it is larger than a threshold.

Based on these measurements, gNB may mitigate CLI for the UE, e.g. in a coordinated approach with the gNB serving the UE causing the CLI. In some example embodiments, gNB may mitigate CLI only if the reported RSRP and/or RSSI is larger than a predefined threshold.

In some example embodiments, gNB determines resource (s) that might carry UL DMRS and/or SRS of a UE served by a neighbor gNB, e.g. based on TDD UL-DL patterns exchanged between the UEs via Xn interface. The gNB configures UEs with a ZP CSI-RS that potentially fall onto UL DMRS (or UL data) of an UL transmission in a neighboring cell (alternatively or in addition on SRS, but SRS may not be precoded like data and may have a different Tx power, so the interference measurement on SRS may be less representative than that on DMRS or data). In one embodiment, all gNB may configure the same ZP CSI-RS, thereby ensuring that no gNB transmits on the ZP CSI-RS resource elements and the signal received and measured by UEs currently receiving in downlink is solely UE-to-UE CLI from UEs currently transmitting in uplink. The configuration may be semi-statically. "Configuring with a ZP CSI-RS" means that the gNB configures the UE to measure the CSI-RS but the gNB does not transmit this CSI-RS (mutes transmission on the resource of the CSI-RS). Thus, UE measures power from other sources (such as CLI) instead of a muted CSI-RS.

The UE reports the power (interference) received on the muted CSI-RS resource. In some example embodiments, it may report only if it (regularly) measures an interference above a certain threshold (possibly relative to the received power of its serving gNB).

These example embodiments do not have "CLI scheduling overhead" but only RRC CSI-RS (re)configuration messages, which are seldom transmitted. The overhead to inform on the resource to measure for CLI avoidance is similar but it differs in the blocked resources: DL ZP CSI-RS vs. Sidelink resource pool. In case of DL ZP CSI-RS, UE does not need any power for D2D transmissions. On the other hand, in case of ZP CSI-RS, serving gNB does not know exactly which UEs interfere with each other, although this knowledge is helpful for the gNBs to perform coordinated scheduling on a per UE transmission basis.

In a further embodiment, a UE first measures CLI on ZP CSI-RS, knowing that it measures ZP CSI-RS based on signaling from its serving gNB. If a configured threshold is reached, the UE switches to sidelink-based CLI measurements to determine the source of its high experienced CLI. The UE broadcasts an open request message according to FIG. 4 (b.1). The message may include the UE's own CLI avoidance information, assuming that CLI may be reciprocal, i.e. that other UEs may experience CLI caused by itself. Other (nearby) UEs that monitor the used sidelink RP receive the request message and broadcast themselves, either only answering with their DMRS/SRS info (if they do not experience strong CLI), or with a request message themselves otherwise. To reduce sidelink message collisions, in FIG. 7 the steps "Reply with CLI Information" and "Send CLI Request" are to be understood as employing the usual collision avoidance mechanisms.

FIG. 9 shows an apparatus according to an example embodiment of the invention. The apparatus may be a terminal (e.g. UE) or an element thereof. FIG. 10 shows a method according to an example embodiment of the invention. The apparatus according to FIG. 9 may perform the method of FIG. 10 but is not limited to this method. The method of FIG. 10 may be performed by the apparatus of FIG. 9 but is not limited to being performed by this apparatus.

The apparatus comprises means for obtaining 10, means for measuring 20, and means for providing 30. The means for obtaining 10, means for measuring 20, and means for providing 30 may be an obtaining means, measuring means, and providing means, respectively. The means for obtaining 10, means for measuring 20, and means for providing 30 may be an obtainer, measurer, and provider, respectively.

The means for obtaining 10, means for measuring 20, and means for providing 30 may be an obtaining processor, measuring processor, and providing processor, respectively.

The means for obtaining obtains, in a sidelink communication, an information about a resource on which a terminal transmits a reference signal, also denoted as CLI avoidance information (S10). The reference signal is a non-zero-power reference signal having a power value larger than zero.

The means for measuring 20 measures a received power on the resource (S20). The means for providing 30 provides an information on the received power (S30). In particular, it may provide the information on the received power to the serving gNB.

FIG. 11 shows an apparatus according to an example embodiment of the invention. The apparatus may be a reception device (e.g. terminal such as a UE) or an element thereof. FIG. 12 shows a method according to an example embodiment of the invention. The apparatus according to FIG. 11 may perform the method of FIG. 12 but is not limited to this method. The method of FIG. 12 may be performed by the apparatus of FIG. 11 but is not limited to being performed by this apparatus.

The apparatus comprises means for providing 110. The means for providing 110 may be a providing means. The means for providing 110 may be a provider. The means for providing 110 may be a providing processor.

The means for providing 110 provides an information about a resource in a sidelink communication, wherein a reference signal is transmitted on the resource (S110).

FIG. 13 shows an apparatus according to an example embodiment of the invention. The apparatus may be a base station (e.g. gNB or eNB) or an element thereof. FIG. 14 shows a method according to an example embodiment of the invention. The apparatus according to FIG. 13 may perform the method of FIG. 14 but is not limited to this method. The method of FIG. 14 may be performed by the apparatus of FIG. 13 but is not limited to being performed by this apparatus.

The apparatus comprises means for means for monitoring 210 and means for mitigating 220. The means for monitoring 210 and means for mitigating 220 may be a monitoring means and mitigating means, respectively. The means for monitoring 210 and means for mitigating 220 may be a monitor and mitigator, respectively. The means for monitoring 210 and means for mitigating 220 may be a monitoring processor and mitigating processor, respectively.

The means for monitoring 210 monitors if a report is received (S210). The report reports on a power of a cross link interference a served terminal receives on a resource. The served terminal is served by a serving base station.

If the report is received (S210="yes"), the means for mitigating 220 mitigates a cross link interference for the served terminal based on the report (S220).

Figure 16:
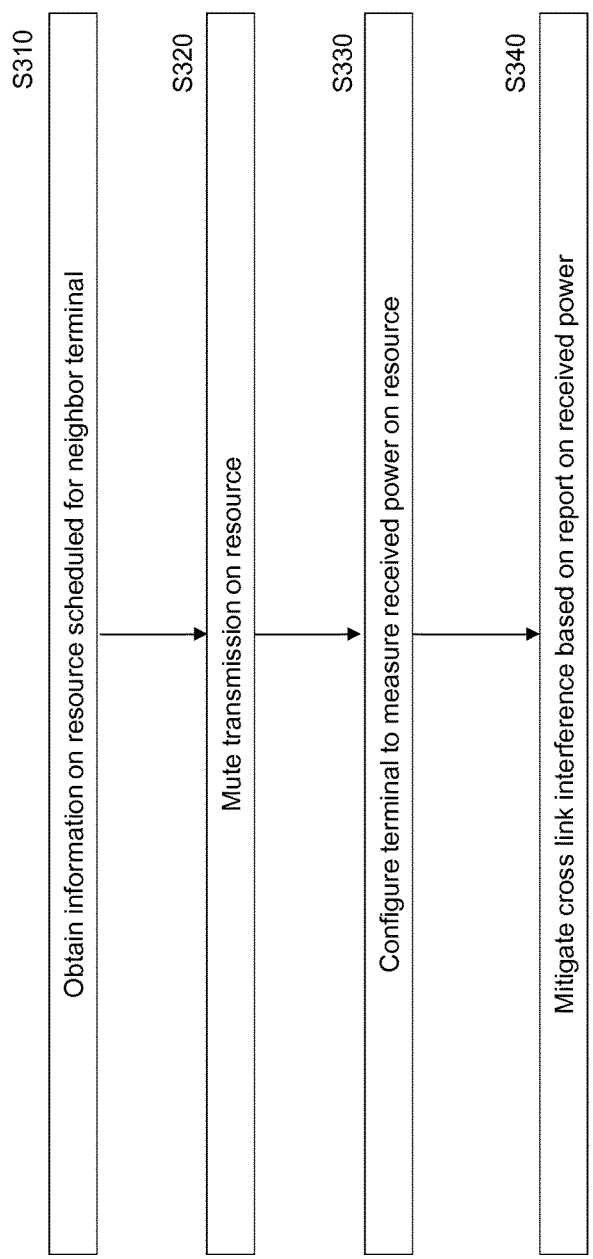
FIG. 16 shows a method according to an example embodiment of the invention.
Figure 15:
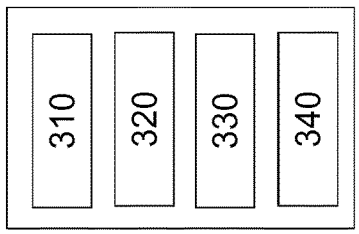
FIG. 15 shows an apparatus according to an example embodiment of the invention.

FIG. 15 shows an apparatus according to an example embodiment of the invention. The apparatus may be a base station (e.g. gNB, eNB) or an element thereof. FIG. 16 shows a method according to an example embodiment of the invention. The apparatus according to FIG. 15 may perform the method of FIG. 16 but is not limited to this method. The method of FIG. 16 may be performed by the apparatus of FIG. 15 but is not limited to being performed by this apparatus.

The apparatus comprises means for obtaining 310, means for muting 320, means for configuring 330, and means for mitigating 340. The means for obtaining 310, means for muting 320, means for configuring 330, and means for mitigating 340 may be an obtaining means, muting means, configuring means, and mitigating means, respectively. The means for obtaining 310, means for muting 320, means for configuring 330, and means for mitigating 340 may be an obtainer, muter, configure, and mitigator, respectively. The means for obtaining 310, means for muting 320, means for configuring 330, and means for mitigating 340 may be an obtaining processor muting processor, configuring processor, and mitigating processor, respectively.

The means for obtaining 310 obtain a neighbor information about a resource (S310). According to the neighbor information, the resource is scheduled by the neighbor base station to be used for transmission by a neighbor terminal.

The means for muting 320 mutes a transmission of a serving base station on the resource (S320). The means for configuring 330 configures a served terminal to monitor a power the served terminal receives on the resource (S330). The served terminal is served by the serving base station. The neighbor base station is different from the serving base station. S320 and S330 may be performed fully or partly in parallel, or S320 may be performed prior to S330.

The means for mitigating 340 mitigates a cross link interference for the served terminal based on a received report on a power the served terminal receives on the resource (S340).

Figure 17:
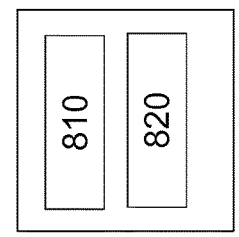
FIG. 17 shows an apparatus according to an example embodiment of the invention.

FIG. 17 shows an apparatus according to an example embodiment of the invention. The apparatus comprises at least one processor 810, at least one memory 820 including computer program code, and the at least one processor 810, with the at least one memory 820 and the computer program code, being arranged to cause the apparatus to at least perform at least one of the methods according to FIGS. 10, 12, 14, and 16 and related description.

Some example embodiments of the invention are described which are based on a 3GPP network (e.g. NR). However, the invention is not limited to NR. It may be applied to any generation (3G, 4G, 5G, etc.) of 3GPP networks. However, the invention is not limited to 3GPP networks. It may be applied to other radio networks, too, which provide some flexibility on uplink/downlink scheduling.

A UE is an example of a terminal. However, the terminal (UE) may be any device capable to connect to the (3GPP) radio network via the channel such as a MTC device, a D2X device etc.

A cell may be represented by the base station (e.g. gNB, eNB, etc.) serving the cell. The base station (cell) may be connected to an antenna (array) serving the cell by a Remote Radio Head. A base station may be realized as a combination of a central unit (one or plural base stations) and a distributed unit (one per base station). The central unit may be employed in the cloud.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

According to the above description, it should thus be apparent that example embodiments of the present invention provide, for example, a terminal (such as a UE), or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, a base station (e.g. gNB or eNB), or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof.

It is to be understood that what is described above is what is presently considered the preferred example embodiments of the present invention. However, it should be noted that the description of the preferred example embodiments is given by way of example only and that various modifications may be made without departing from the scope of the invention as defined by the appended claims.

The invention claimed is:

1. An apparatus, comprising:
   circuitry configured to obtain, in a sidelink communication, an information about a resource on which a terminal transmits a reference signal;
   circuitry configured to measure a received power on the resource;
   circuitry configured to provide an information on the received power,
   wherein the measuring circuitry is configured to measure the power on the resource based on an indication received from a base station that the base station mutes transmission on the resource; and the apparatus comprises:
   circuitry configured to check if the power is larger than a second power threshold;
   circuitry configured to forbid the obtaining circuitry to obtain, in the sidelink communication, the information about the resource if the power is not larger than the threshold;
   wherein the obtaining circuitry is configured to obtain, in the sidelink communication, an identification of the terminal transmitting the reference signal if the power is larger than the threshold.

2. The apparatus according to claim 1, comprising:
   circuitry configured to compare the received power with a first power threshold;
   circuitry configured to inhibit transmitting the information on the received power if the received power is smaller than the power threshold.

3. The apparatus according to claim 1, comprising:
   circuitry configured to supervise if a trigger is received from a base station;
   circuitry configured to prohibit measuring to the received power if the trigger is not received.

4. The apparatus according to claim 1, comprising:
   circuitry configured to request the information about the resource in the communication;
   wherein the obtaining circuitry is configured to obtain the information about the resource in response to the requesting.

5. The apparatus according to claim 1, further comprising:
   circuitry configured to surveil if an information about a sidelink resource is received;
   circuitry configured to set up the sidelink communication on the sidelink resource.

6. An apparatus, comprising:
   circuitry configured to obtain a neighbor information about a resource;
   circuitry configured to mute a transmission of a serving base station on the resource;
   circuitry configured to configure a served terminal to monitor a power the served terminal receives on the resource;
   circuitry configured to mitigate a cross link interference for the served terminal based on a received report on a power the served terminal receives on the resource,
   wherein the served terminal is configured to be served by the serving base station; according to the neighbor information, wherein the resource is configured to be scheduled by the neighbor base station to be used for transmission by a neighbor terminal; and
   wherein the neighbor base station is different from the serving base station, wherein the obtaining circuitry is configured to obtain the information about the resource based on an uplink-downlink pattern received from the neighbor base station,
   wherein the configuring circuitry is configured to inform the served terminal that the transmission of the serving base station on the resource is muted.

7. A method, comprising:
   obtaining, in a sidelink communication, an information about a resource on which a terminal transmits a reference signal;
   measuring a received power on the resource;
   providing an information on the received power,
   measuring the power on the resource based on an indication received from a base station that the base station mutes transmission on the resource;
   checking if the power is larger than a second power threshold;
   forbidding obtaining, in the sidelink communication, the information about the resource if the power is not larger than the threshold; and
   obtaining, in the sidelink communication, an identification of the terminal transmitting the reference signal if the power is larger than the threshold.

8. The method according to claim 7, comprising:
   comparing the received power with a first power threshold;
   inhibiting transmitting the information on the received power if the received power is smaller than the power threshold.

9. The method according to claim 7, comprising:
   supervising if a trigger is received from a base station;
   prohibiting measuring to the received power if the trigger is not received.

10. The method according to claim 7, comprising:
    requesting the information about the resource in the communication;

obtaining the information about the resource in response to the requesting.

11. The method according to claim 7, further comprising:

surveilling if an information about a sidelink resource is received;

setting up the sidelink communication on the sidelink resource.

\* \* \* \* \*